United States Patent
Liu et al.

(10) Patent No.: US 9,070,004 B2
(45) Date of Patent: Jun. 30, 2015

(54) AUTOMATIC SEGMENTATION AND CHARACTERIZATION OF CELLULAR MOTION

(75) Inventors: Xiaofeng Liu, Niskayuna, NY (US); Dirk Ryan Padfield, Albany, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 255 days.

(21) Appl. No.: 13/463,100

(22) Filed: May 3, 2012

(65) Prior Publication Data
US 2013/0294675 A1 Nov. 7, 2013

(51) Int. Cl.
G06K 9/00 (2006.01)
G06T 7/00 (2006.01)
G06T 7/20 (2006.01)

(52) U.S. Cl.
CPC ............ G06K 9/0014 (2013.01); G06T 7/0016 (2013.01); G06T 7/2033 (2013.01); G06T 7/2053 (2013.01); G06T 2207/10016 (2013.01); G06T 2207/10056 (2013.01); G06T 2207/20021 (2013.01); G06T 2207/20036 (2013.01); G06T 2207/20144 (2013.01); G06T 2207/20148 (2013.01); G06T 2207/30024 (2013.01)

(58) Field of Classification Search
None
See application file for complete search history.

(56) References Cited

U.S. PATENT DOCUMENTS

| 5,159,932 | A | 11/1992 | Zanetti et al. |
|---|---|---|---|
| 7,018,338 | B2 | 3/2006 | Vetter et al. |
| 7,724,929 | B2 | 5/2010 | Shen |
| 7,822,246 | B2 | 10/2010 | Senegas et al. |
| 7,831,074 | B2 | 11/2010 | Zhou et al. |
| 7,940,978 | B2 | 5/2011 | Rittscher et al. |
| 2006/0083440 | A1* | 4/2006 | Chen ............................ 382/284 |
| 2006/0247544 | A1 | 11/2006 | Qazi et al. |
| 2007/0109874 | A1 | 5/2007 | Padfield et al. |
| 2007/0185946 | A1* | 8/2007 | Basri et al. .................... 708/200 |
| 2008/0304732 | A1* | 12/2008 | Rittscher et al. .............. 382/133 |
| 2013/0070971 | A1 | 3/2013 | Kunihiro et al. |

FOREIGN PATENT DOCUMENTS

| EP | 2250624 B1 | 12/2011 |
|---|---|---|
| GB | 2479628 A | 10/2011 |
| WO | 2007042044 A1 | 4/2007 |
| WO | 2008149055 A1 | 12/2008 |
| WO | 2011122200 A1 | 10/2011 |
| WO | 2011128228 A1 | 10/2011 |

OTHER PUBLICATIONS

Sebastian et al., "Automatic Characterization of in Vitro Cardiomyocyte Motion", pp. 1-5, (2007).
Search Report and Written Opinion from corresponding PCT Application No. PCT/SE2013/050451 dated Oct. 4, 2013.

* cited by examiner

Primary Examiner — Hadi Akhavannik
(74) Attorney, Agent, or Firm — Fletcher Yoder, P.C.

(57) ABSTRACT

The present techniques provide for the evaluation of cellular motion and/or cellular properties based on an analysis of motion for cluster of cells. In an exemplary technique, images of cells are acquired and the image is segmented into clusters. Motion data for each respective cluster is derived from the segmented data. The properties of each cluster can be used to evaluate cellular properties and/or cellular motion properties.

20 Claims, 13 Drawing Sheets
(6 of 13 Drawing Sheet(s) Filed in Color)

AUTOMATIC SEGMENTATION AND CHARACTERIZATION OF CELLULAR MOTION

BACKGROUND

The present techniques relate generally to the evaluation and assessment of cellular cultures, tissues and organisms which may be used to assess pharmacological effects. In particular, the present techniques relate to the use of visual motion analysis in the evaluation and assessment of cellular motion.

The focus of the pharmaceutical industry is typically to develop new and medically useful drugs that are effective at treating a disease or disorder of a patient. In addition, it is generally desirable that such new and useful drugs have few or no adverse side effects. However, as should be apparent, the number of compounds that might be useful as drugs far exceeds the number that will ultimately be developed. As a result, the pharmaceutical industry screens vast numbers of drug candidates in an attempt to select those few that warrant additional testing and development.

One such screening technique utilizes simple living system based assessment, e.g. cell assays, to determine the effect of a compound on one or more characteristics of a cell culture. Such cell assays are relatively inexpensive compared to in vivo animal studies and therefore provide a cost effective way to perform large-scale screening of compounds. In particular, a typical cell assay may involve applying a compound of interest to a cell culture and subsequently evaluating one or more characteristics of the cells forming the culture. Based upon the evaluation of the characteristics, the effect of the compound may be evaluated.

In some instances, however, it may be difficult to assess the effect of the compound on the characteristic of interest. For example, in some instances, the characteristic of interest may not be attributable to a single cell but may instead be a characteristic of a group of cells. One example of such a characteristic is the coordinated motion of cells, such as cardiac cells, that may correspond to the rhythmic or periodic motion of a corresponding organ, such as the beating of a heart.

Currently, however, there is no way to effectively assess such coordinated motion in a quick, objective, and reproducible manner. For example, one current technique for assessing treatment effects on coordinated cellular motion involves having an observer watch a video of the cell culture after treatment with a compound and make an assessment of the effect of the compound on the coordinated motion of the cells. Such observer based analysis, however, is subjective, slow, and generally not reproducible.

Alternatively, aggregate area measurements of one or more electrical properties of the cells of the culture may be made and, based upon changes in the one or more electrical properties, an assessment of the effect of the compound on the motion of the cells may be made. Such electrophysiological assays, however, may be problematic due to the technical difficulty involved in performing the assay as well as to relatively low throughput, which may be unsuitable for mass screenings. Further, there may be a poor correlation between the aggregate electrical measurements and the cellular motion. In addition, to the extent that the characteristic of interest is coordinated motion, not simply cellular motion in general, such aggregate electrical measurements may not be useful in assessing the coordinated nature of the cellular motion.

It is, therefore, desirable to be able to more effectively assess certain cellular characteristics, such as characteristics associated with cellular motion, when determining the effect of a compound on the cells.

BRIEF DESCRIPTION

In accordance with the present technique, motion data is derived from images of one or more cells. The image is segmented based on the image data itself, and the image data of each individual cluster is analyzed to extract a motion signal. Motion signals may then be used to evaluate the properties or motion of the one or more cells, such as by performing a time-based analysis, such as a time series analysis, on the one or more motion components. Based on the evaluation of the cells, an effect of a treatment administered to the cells may be evaluated and/or the state of some or all of the cells may be determined.

In one aspect of the present technique, a method is provided for evaluating cellular motion and/or properties. This method includes the act of acquiring a plurality of images of one or more cells and segmenting the images into a plurality of clusters. Motion signals for the one or more cells are extracted for each of the plurality of clusters. At least one of cellular motion properties or cellular properties is evaluated, based on the motion signals.

In a further aspect of the present technique, a computer program is provided on one or more computer-readable media. The computer program includes a memory storing executable instructions configured to receive image data corresponding to images acquired over time of a plurality of cells. In addition the computer program includes executable instructions configured to segment the image data into a plurality of clusters, wherein each individual cluster represents only a portion of the plurality of cells and wherein the image data is not separated into motion components before being segmented into the plurality of clusters. Further, the computer program includes executable instructions configured to extract a motion signal from each respective cluster of the plurality of clusters; evaluate at least one of cellular motion properties or cellular properties based on the motion signal from each respective cluster; and generate an output indicative of the cellular motion properties of the plurality of clusters.

In an additional aspect of the present technique, an image analysis system is provided. The image analysis system includes an imager configured to optically analyze a plurality of cells and data acquisition circuitry of the plurality of cells via the imager. The image analysis system also includes data processing circuitry configured to segment image data from the images of the plurality of cells into a plurality of clusters, extract a motion signal from image data of each individual cluster, and evaluate at least one of cellular motion properties or cellular properties based on the motion signal of each individual cluster.

BRIEF DESCRIPTION OF THE DRAWINGS

The patent or patent application contains at least one drawing executed in color. Copies of this patent or patent application publication with color drawings will be provided by the Office upon request and payment of the necessary fee. These and other features, aspects, and advantages of the present invention will become better understood when the following detailed description is read with reference to the accompanying drawings in which like characters represent like parts throughout the drawings, wherein:

FIG. 5b shows individual foreground blocks of the image of FIG. 5a;

FIG. 6a is an affinity matrix representing the image of FIG. 5a;

FIG. 6b shows affinity propagation clusters representing the image of FIG. 5a;

FIG. 6c is the classification representing the image of FIG. 5a;

FIG. 7b shows data representing two identified regions of FIG. 7a;

FIG. 7c shows data representing three identified regions of FIG. 7a;

FIG. 9f shows the extracted motion signal for FIG. 9a;

DETAILED DESCRIPTION

Figure 1:
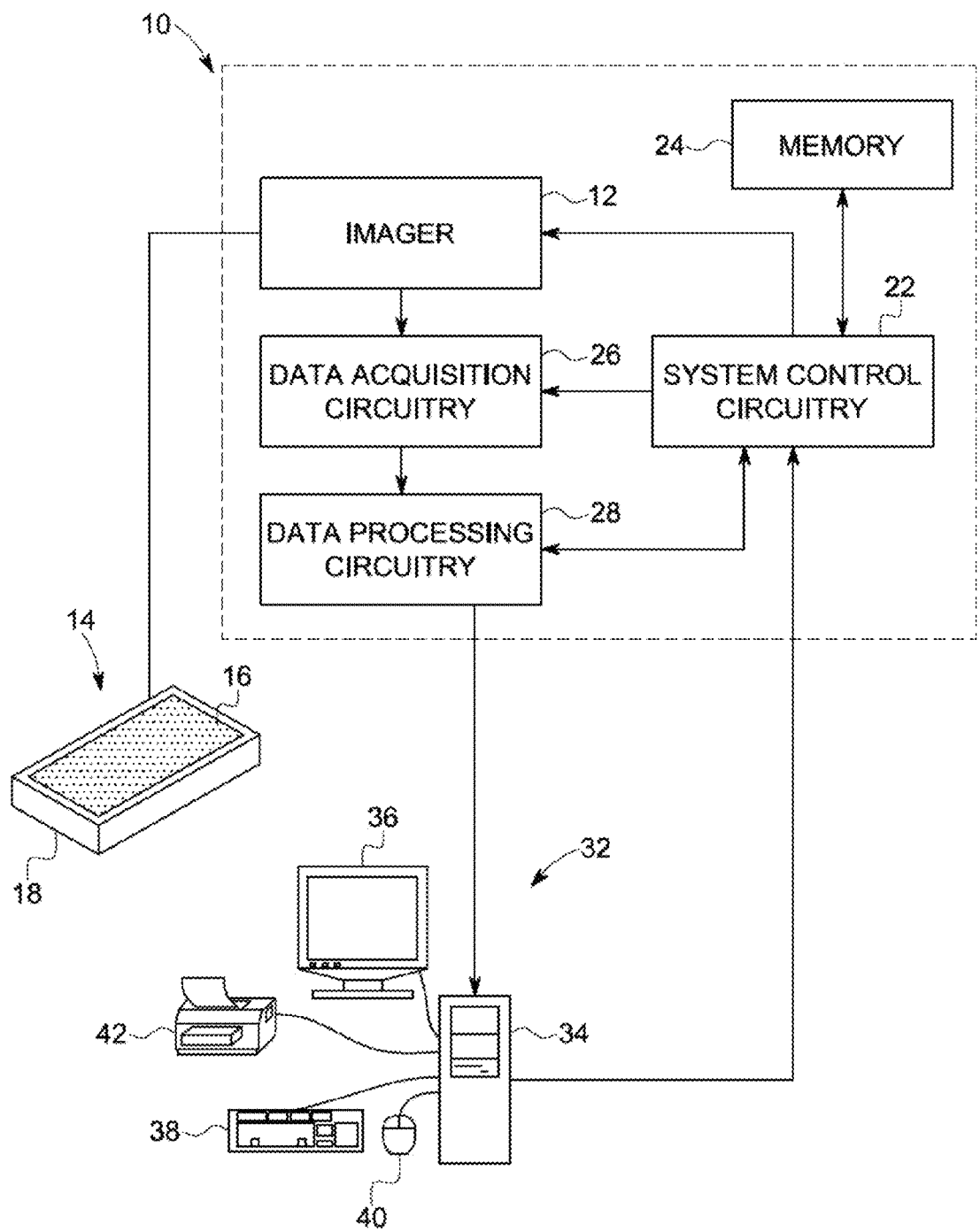
FIG. 1 is a diagrammatical view of an exemplary system for use in acquiring image data of cells, in accordance with aspects of the present technique.

The present technique is directed to the high-throughput screening of treated and/or untreated cell cultures using automated or semi-automated optical methods. For example, in one embodiment, the present technique may be utilized to assess treatment effects of compounds on cellular motion, thereby potentially providing insight into the effect of a compound on the motion or coordination of motion of treated cells. In such an example, a high-throughput microscope may be employed to obtain a video of a treated collection of cells. Frames of the video (e.g., image data) may be analyzed as provided herein to segment the images into cluster with particular characteristics or patterns to generate data representing cellular motion over time. Provided herein are novel motion-based segmentation techniques in which cellular image data is segmented into regions with different beating rhythms. In particular embodiments, the techniques may be implemented without specifying the number or characteristics of regions beforehand. The regions can then be characterized separately for improved cellular motion analysis.

Analysis of cell motion via video microscopy is non-invasive and at least partially automated. While certain techniques may involve analysis of an overall motion field of a whole image (e.g., an image that is not segmented prior to a determination of motion data), such whole field analysis may be more suitable for dense populations of cells that exhibit relatively uniform motion characteristics. For less dense populations of cells, or cells of any density that exhibit intrafield variability in motion characteristics, an overall motion analysis of the whole image may mask the variability within the image. That is, extracted overall signals from a whole image may represent a mixture of different motion characteristics.

In addition, cell clusters with synchronous motion may have different and inhomogeneous motion trajectories within the clusters, and the trajectories are dependent on the relative locations of cells and/or the distances to the beating cells. Therefore the clusters may not be separated based on motion trajectories.

Provided herein are techniques that incorporate motion-based segmentation that, in particular embodiments, involve segmenting image data from cells and extracting individual clusters to facilitate separate measurement of regions beating with different patterns. The techniques may be used with cells of various plating densities or cells with varying growth and/or motion patterns. Such techniques may provide improved analysis of cellular motion. The techniques involve segmenting images based directly on the image data itself. In certain embodiments, the segmentation is not based on motion field data or is not trajectory-based segmentation.

In this manner, cellular motion from segmented images may be used in the evaluation of different treatments or environmental factors where effects on cellular motion may be expected. For example, the techniques discussed herein may be useful in evaluating drug candidates for effects on the cardiac cycle, such as for the potential to induce arrhythmias. In such a screening context, the various candidate compounds may be evaluated for their effects on the QT interval or other recognized heart cycle intervals of interest. For example, drug candidates may be screened to assess whether they prolong the QT interval, which has been theorized as being linked to arrhythmiogenesis. In such an implementation, the candidate compounds may be assayed to determine their effects on sheets or panels of mature cardiomyocytes which, untreated, would move in a coordinated, rhythmic manner at a given frequency. Compounds that alter the rhythmic motion of the cardiomyocytes, either by causing the frequency of the rhythmic motion to increase or decrease or by disrupting the coordination of the motion, may warrant further scrutiny for potential effects on the cardiac cycle. As provided herein, the techniques may assess motion from clusters or groups of cells in an image field.

With the foregoing in mind, an exemplary imaging system 10 capable of operating in accordance with the present technique is depicted in FIG. 1. Generally, the imaging system 10 includes an imager 12 that detects signals and converts the signals to data that may be processed by downstream processors. As described more fully below, the imager 12 may operate in accordance with various physical principles, such as optical principles, for creating the image data. In general, the imager 12 generates image data, of any dimension, in a conventional medium, such as photographic film, or in a digital medium. For example, in some embodiments the imager 12 may generate one or a limited numbers of lines or partial lines of image data, i.e., substantially one-dimensional image data. In other embodiments, the imager 12 may generate substantially two-dimensional image data encompassing an area, i.e., a circular, square, rectangular, or similar area. Furthermore, in one embodiment, the imager 12 may provide some degree of magnification while in other embodiments the imager 12 provides little or no magnification. For example, in one implementation, the imager 12 may be a microscope, such as a high-throughput microscope, suitable for image and/or video acquisition under magnification at suitable light wavelengths (such as visible, infrared, and/or ultraviolet light wavelengths). For example, the imager 12 may be any suitable imaging device, including a line scan camera, a fluorescence microscope, a confocal fluorescence microscope, a laser scanning confocal microscope, or a total internal reflection fluorescence microscope.

In the depicted embodiment, the imager 12 is configured to image a cell culture 14, such as a culture of myocytes or other suitable cells 16, grown on a slab 18 of suitable culture media, such as a 100 μm×100 μm slab of culture media, under suitable culture conditions, such as at 37° C. and 5% $CO_2$. While such a collection of cells (a slab) is one possible medium upon which the one or more cells 16 can be provided, the one or more cells 16 may alternatively be provided or grown on other sizes or configurations of media and may, in some implementations, be provided as a volume for analysis. The cell culture 14 will typically be of a cell type and maturity suitable for performing a desired assay or for otherwise assessing a desired treatment effect. In some embodiments, the cell culture 14 may include progenitor cells or other cells which are matured or grown into the desired cell type, such as myocytes.

In one embodiment, the imager 12 operates under the control of system control circuitry 22. The system control circuitry 22 may include a wide range of circuits, such as circuitry controlling the emission of various types of electromagnetic radiation (such as visible, infrared, and/or ultraviolet light, X-rays, electron beams, and so forth) for use in the imaging process. Likewise, in some embodiments, the system control circuitry 22 may include timing circuitry, circuitry for coordinating data acquisition in conjunction with movement of a sample, circuitry for controlling the position of the imager 12 and/or the samples undergoing images, and so forth.

In the present context, the imaging system 10 may also include memory elements 24, such as magnetic, solid state, or optical storage media, for storing programs and routines executed by the system control circuitry 22 and/or by associated components of the system 10, such as data acquisition circuitry 26 and/or data processing circuitry 28. The stored programs or routines may include programs or routines for performing all or part of the present technique.

In the depicted embodiment, data acquisition circuitry 26 is employed to acquire image data from the imager 12. In optical embodiments, the data acquisition circuitry 26 may be configured to acquire image data via one or more optical sensing elements, such as elements that may be found in digital cameras, that are disposed on or in the imager 12. The acquired image data may be digital or analog in nature and may, in certain embodiments, represent sequential images or video composed of such sequential images. In embodiments where the initially acquired image data is analog in nature, the data acquisition circuitry 26 may also be configured to convert the analog data to a digital format. Likewise, the data acquisition circuitry 26 may be configured to provide some initial processing of the acquired image data, such as adjustment of digital dynamic ranges, smoothing or sharpening of data, as well as compiling of data streams and files, where desired.

The image data acquired by the data acquisition circuitry 26 may be processed, such as by data processing circuitry 28 in the depicted embodiment. For example, in certain embodiments, the data processing circuitry 28 may perform various transformations or analyses of the image data, such as ordering, sharpening, smoothing, feature recognition, and so forth. Prior or subsequent to processing, the image data may be stored, such as in memory elements 24 or a remote device, such as a picture archiving communication systems or workstation connected to the imaging system 10, such as via a wired or wireless network connection.

The raw or processed image data may, in some embodiments, be provided to or displayed on an operator workstation 32. In such embodiments, the operator workstation 32 may be configured to allow an operator to control and/or monitor the above-described operations and functions of the imaging system 10, such as via an interface with the system control circuitry 22. The operator workstation 32 may be provided as a general purpose or application specific computer 34. In addition to a processor, the computer 34 may also include various memory and/or storage components including magnetic and optical mass storage devices, internal memory, such as RAM chips. The memory and/or storage components may be used for storing programs and routines for performing the techniques described herein that are executed by the computer 34 or by associated components of the imaging system 10. Alternatively, the programs and routines may be stored on a computer accessible storage and/or memory remote from the computer 34 but accessible by network and/or communication interfaces present on the compute 34.

The computer 34 of the operator workstation 32 may also comprise various input/output (I/O) interfaces, as well as various network or communication interfaces. The various I/O interfaces may allow communication with user interface devices of the operator workstation 32, such as a display 36, keyboard 38, mouse 40, and/or printer 42, that may be used for viewing and inputting configuration information and/or for operating the imaging system 10. The various network and communication interfaces may allow connection to both local and wide area intranets and storage networks as well as the Internet. The various I/O and communication interfaces may utilize wires, lines, or suitable wireless interfaces, as appropriate or desired.

Though a single operator workstation 32 is depicted for simplicity, the imaging system 10 may actually be in communication with more than one such operator workstation 32. For example, an imaging scanner or station may include an operator workstation 32 used for regulating the parameters involved in the image data acquisition procedure, whereas a different operator workstation 32 may be provided for viewing and evaluating results.

For the purpose of explanation, certain functions and aspects of the present technique have been described as being separate and distinct or as being associated with certain structures or circuitry. However, such distinctions have been made strictly to simplify explanation and should not be viewed as limiting. For example, for simplicity the preceding discussion describes implementation via a discrete imaging system 10 and operator workstation 32. As will be appreciated, however, certain functions described as being performed by the imaging system 10, such as data acquisition, data processing, system control, and so forth, may instead be performed on the operator workstation 32 or may have differing aspects, some of which are performed on the imaging system 10 and others of which are performed on the operator workstation 32. Indeed, in practice, virtually all functions attributed to the imaging system 10, with the possible exception of the functions attributed to the imager 12, may be performed on an operator workstation 32. In other words, the data acquisition circuitry 26, memory 24, data processing circuitry 28, and/or system control circuitry 22 may be provided as hardware or firmware provided in an operator workstation 32 and/or as software executable by the operator workstation 32. For example, some or all of the circuitry described herein may be provided as routines executed on a suitable processor or coprocessor of a computer 34 of an operator workstation 32. Indeed, it should be understood that the term circuitry, as used herein, encompasses, dedicated or generalized hardware or firmware implementations and/or processor-executable software implementations suitable for implementing the described functionality. In a specific embodiment, the present techniques may be implemented on an IN Cell platform (GE Life Sciences, Piscataway, N.J.), such as an IN Cell Analyzer 6000. It should be understood that such a platform may be implemented with hardware modifications (such as a modified imager) and software modifications as provided herein. In one embodiment, the IN Cell Analyzer 6000 or other suitable cell imaging device may be modified with a camera that acquires images at least 1 frame per second (or, at least 5, 10, 20, or 30 frames per second) and with a software upgrade that facilitates the techniques for segmenting the acquired images.

Figure 2:
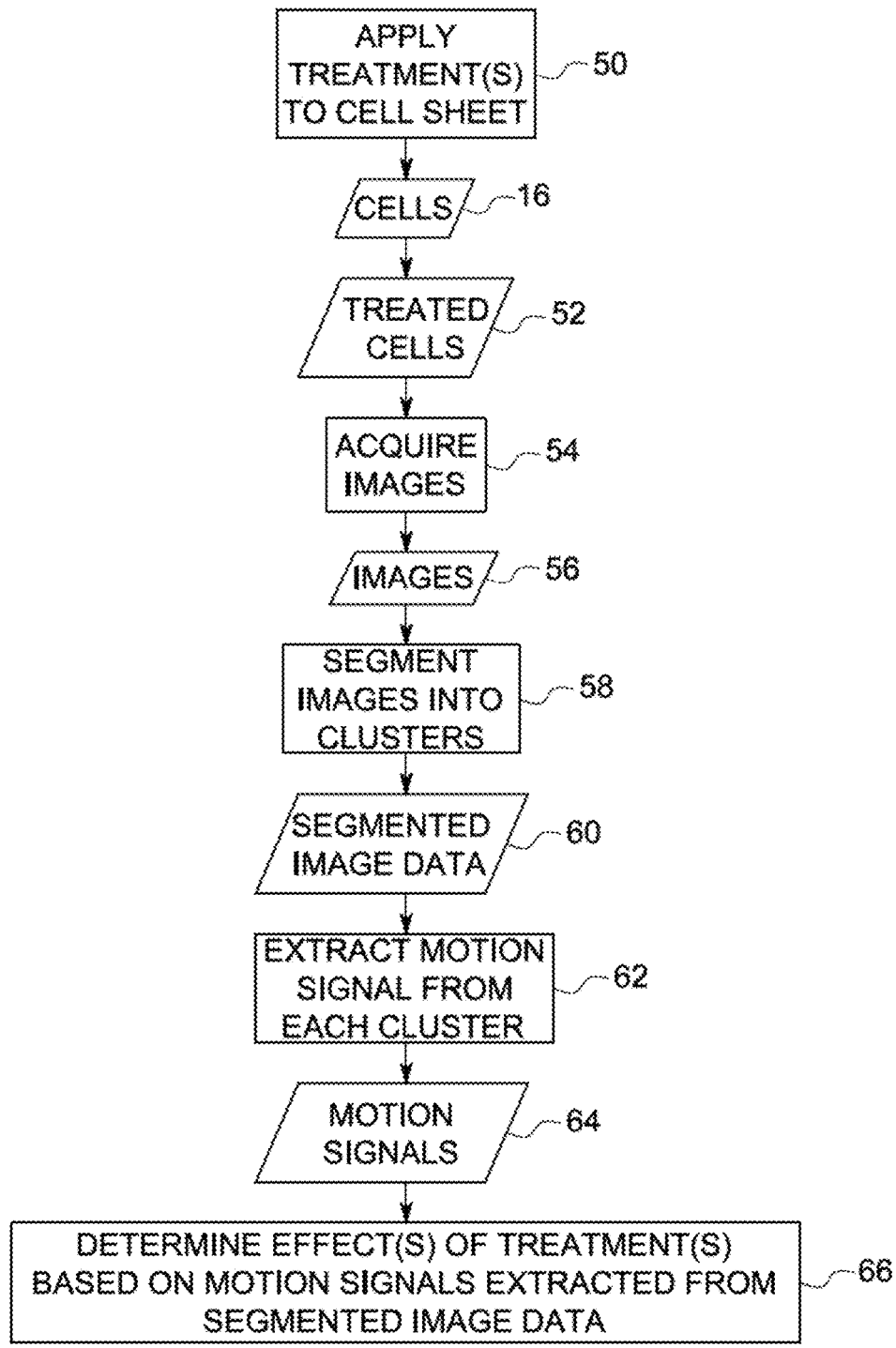
FIG. 2 is a flow chart depicting acts for determining treatment effects on cultured cells, in accordance with the present technique.

In view of the foregoing, and referring now to FIG. 2, examples of implementations illustrating one aspect of the present technique are described. In the depicted implementation, one or more cells 16 are treated (block 50) with a desired chemical or physical stimulus to produce one or more respective treated cells 52. The cells 16 may be any appropriate cell type, including mammalian cells, human cells, immortalized cell lines, myocytes (such as cardiomyocytes), progenitor cells, and so forth. While the one or more cells 16 may be provided in vitro, i.e., as part of a cell culture 14 (FIG. 1), in some embodiments, in other embodiments, in vivo cells (such as the cells of a model organism or tissue sample) may be employed. For example, in one implementation, cells of a model organism that is conducive to internal optical inspection may be employed. One example, of such an organism is a zebra fish, which has semi-transparent characteristics, allowing internal organs, tissues, and cells to be visually observed. Other examples of potential model organisms include *Caenorhabditis elegans*, various species of the genus *Drosophila*, and so forth. In such in vivo embodiments, the model organism or organisms may be fixed in a generally transparent medium to immobilize the organisms before or after application of the desired treatment to the organisms. The internal cells, tissues, or organs of interest in the fixed organisms may then be microscopically observed.

As will be appreciated, the term "treatment" as used herein may encompass various physical or chemical stimuli applied to the cells 16. For example, a treatment may include electrical, mechanical, thermal, or other modifications to the physical environment of the cells 16. Likewise, a treatment may include application of a compound or mixture of compounds to the cells 16. Such a compound may be a test compound or drug candidate being reviewed for pharmacological effects or side effects. In such chemical treatment implementations, the compound administered may be any molecule, either naturally occurring or synthetic, e.g., protein, oligopeptide (e.g., from about 5 to about 25 amino acids in length), small organic molecule, polysaccharide, lipid, fatty acid, polynucleotide, oligonucleotide, etc., to be tested for effects on the cell culture 14. The test compound can be in the form of a library of test compounds, such as a combinatorial or randomized library that provides a sufficient range of compound structural diversity. Further, in some embodiments, cells may be genetically altered by "knocking out" or silencing specific genes in order to mimic different metabolic or familial cellular disorders.

Once the treated cells 52 are generated, images 56 are acquired (block 54) of the treated cells. In one embodiment, the images 56 may be sequentially acquired, such as at a give time interval (every half-second, second, two second, and so forth). Alternatively, the images 56 may be acquired as part of a video, i.e., the images 56 may be frames of a video. In one implementation, the frequency at which images 56 are generated is about twice (or greater) the frequency of the motion under observation. By way of example, if the motion of cardiomyocytes was under observation and such motion was believed to have a frequency of approximately 4 Hz, the rate at which images 56 are generated would be about 8 Hz or greater in this example, i.e., 8 frames per second or greater (e.g., 10-20 frames per second). In embodiments where the images 56 are acquired under magnification, such as using a high-throughput microscope, the images 56 may represent the treated cells at 2×, 4×, 8×, 16×, 32× or some other suitable magnification.

Based upon the images 56, segmented image data 60 may be generated (Block 58). In the depicted embodiment, the segmented image data 60 represents identification of individual clusters of cells with common characteristics, e.g., beating frequency for cardiomyocytes, based on the image data. In particular embodiments, the number of clusters within the image data is unknown before segmentation takes place. In other embodiments the number of clusters is predetermined.

Segmenting cells based on their motion patterns facilitates correctly extracting motion signals. Certain approaches based on the analysis of motion fields are less effective as they assume that all cells are connected and beat at the same rhythm. However, in the case of multiple cell colonies that undergo different motion patterns, the extracted signals are mixtures of different motion characteristics from all colonies and thus difficult to separate. In addition, such techniques may use an assumption that the cell population is dense and occupies most of the image, which may not be the case. Segmenting cells based on their motion patterns is also a difficult task. Cardiomyocytes have similar appearance and are connected, and there are no clear boundaries among regions with different beating patterns. Thus traditional texture or intensity-based segmentation is not as effective. Moreover, the trajectories of tissues under the same beating rhythm can be very different depending on their relative locations in the cell population and distances to the beating cells. Therefore segmentation methods based on motion trajectory and image clustering, which is well studied in object recognition and computer vision, do not work well for cardiomyocytes segmentation. Another drawback of motion trajectory based methods is that the results depend on the accuracy of motion estimation, e.g., optical flow or deformable registration. When the cell motion is too little or too large, the cells lack texture, or image contrast changes over time, the computed motion fields are less accurate and may cause errors in the segmentation results The motion segmentation approach solves problems presented by previous techniques. Once the individual clusters are identified, motion signals 64 are extracted from each respective cluster (Block 62). That is, in embodiments in which there are two or more clusters of cells, the motion signals 64 are not representative of the overall image motion data, but instead represent each individual cluster. Various techniques may be applied to extract the motion signal 64. In some implementations, traditional optical flow algorithms may be applied to extract the motion signal 64 from the segmented image data 60. In such implementations, a constraint, such as an intensity constraint, may be employed to enforce some degree of quality control (such as regarding consistency or smoothness) on the extracted motion signal 64. In other implementations, other motion extraction techniques may be employed. An example of such an alternative motion extraction technique employs deformable registration algorithms or modified versions of such algorithms to extract the motion data.

Because the motion signal 64 may be complex, it may be desirable to remove or reduce some of the complexity to facilitate analysis. This may be accomplished in various ways. For instance, in one embodiment, the motion signal 64 is decomposed to generate respective components that may be used to evaluate or characterize the observed motion. Such decomposition may be performed using principal component analysis on moving texture, i.e., image intensity, as opposed to motion fields. In other embodiments, the techniques provided herein may be used in conjunction with PCA and segmentation based on motion fields. For example, the $k_{th}$ clustered region is denoted as $$C_k = \{x_{ki}\}_{i=1}^{Nk}$$

with $N_k$ being the number of pixels in $C_k$. The moving texture is represented as $$T_k(t)=[I(x_{k1},t), \ldots ,I(x_{kNk},t)]^T \quad (1)$$

Figure 3A:
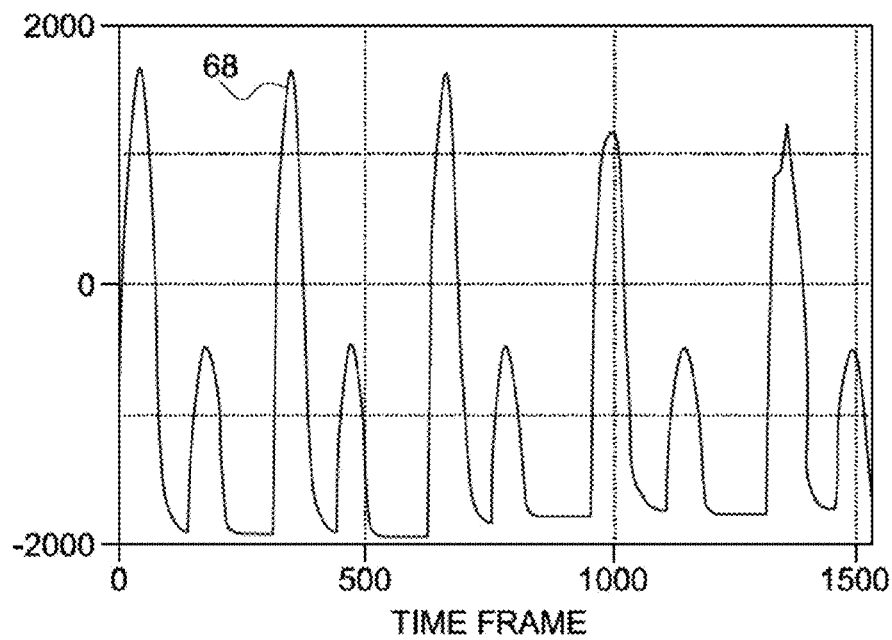
FIG. 3a is a graphical representation of a mixed motion signal extracted from image data.
Figure 3B:
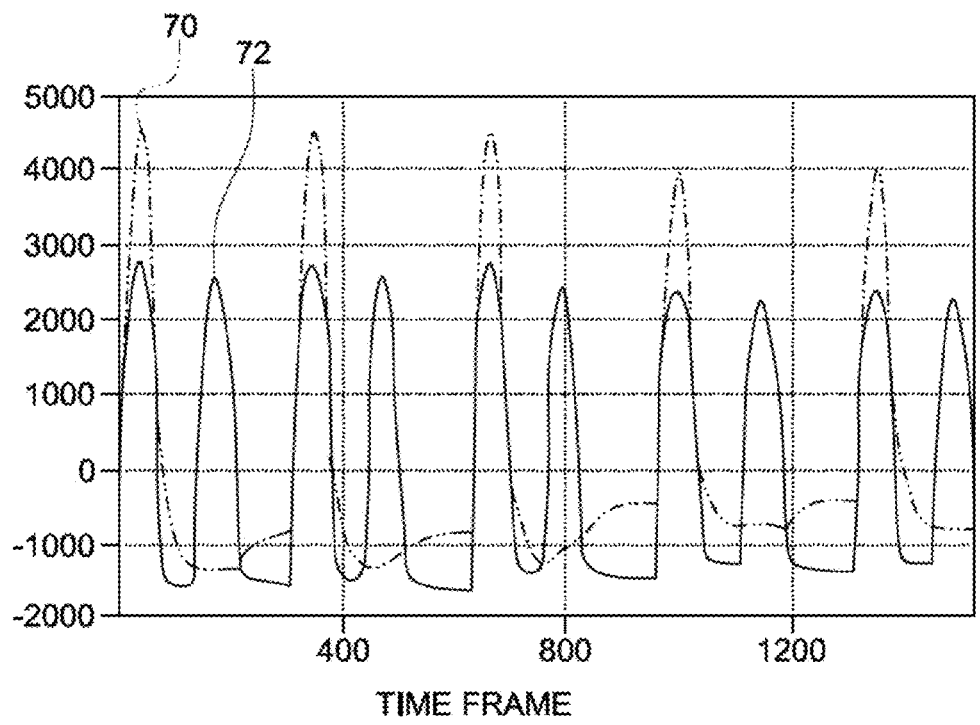
FIG. 3b is a graphical representation of separated motion signals extracted from image data.

The low dimensional motion signal is then extracted by applying PCA to the set of $T_k(t)$ for t=0 ... N. FIG. 3a shows a mixed signal representative of the motion field component of an overall image derived from a video sequence of two cardiomyocytes with different beating rates. A single signal 68 results from the analysis, despite the source image showing two beating rates. FIG. 3b shows an example of first principal components extracted from two clusters segmented according to the techniques provided herein in which the different signals 70 and 72 are representative of two beating rates.

Figure 4:
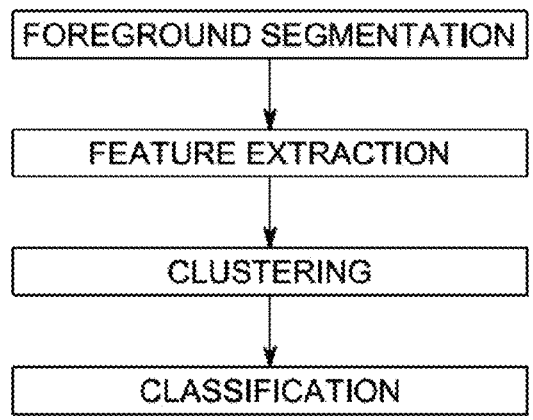
FIG. 4 is a flow chart depicting an example of a segmentation technique.

FIG. 4 is an implementation of segmenting image data into clusters (e.g., block 58). A foreground segmentation (block 80) of an image sequence 78 subtracts stationary regions, with or without tissues, that do not contribute to a cellular motion signal. In one example, in the case of cardiomyocytes, such regions may have a similar appearance to the beating cardiomyocytes and may lack identifiable boundaries between them. In a specific embodiment, stationary background may be subtracted based on temporal variation of image intensity, such as $$\sigma_t(x)=std_t(I(x,t)), \quad (2)$$

which is the standard deviation (std) of intensity I over time t for every pixel x. The foreground is segmented by thresholding $\sigma_t(x)$ with a threshold selected by histogram analysis, followed by morphological operations. The resulting binary foreground mask is denoted as m(x). After the stationary features are removed, feature extraction is performed (block 82). One example of feature extraction is a nearly periodic motion feature (NPMF) based on periodic features and the similar frequency spectrum of synchronous cells. First, the image is divided into non-overlapping blocks of equal size to reduce computation and be robust to noise. In a specific example, the block size is chosen to be 32×32. However, any suitable block size may be chosen. For example, each block may consist of a single pixel or may be a 2×2, 4×4, 64×64, or other size block. If a large portion of a block is determined to include foreground pixels, that block is designated a foreground block (FB). Otherwise, a block is designated to be a background block. For each FB $b_i$, an appearance function describes the moving textures caused by cellular motion. The appearance function, in one embodiment, may be the mean intensity change over time for the foreground pixels, i.e., $$a_i(t) = \sum_{x \in bi} \frac{(I(x, t) - I(x, 0))m(x)}{\sum_{x \in bi} m(x, t),} \quad (3)$$

where I(x, 0) is the image at first time frame. Appearance functions for FBs with different beating rates are often different, but FBs that beat with the same rate may also be different because of other appearance features such as the inhomogeneous textures of the cells and cellular motion that dependent on cell locations.

Accordingly, feature extraction may also include a motion-sensitive feature based on the autocorrelation function (ACF) of $a_i(t)$. Given a time series $a_i(t)$, the ACF is defined as the cross-correlation of itself as a function of time shift τ, i.e., $$R_{ai}(\tau) = \frac{E[(a_i(t) - \overline{a_i})(\overline{a_i}(t+\tau)) - \overline{a_i})]}{\sigma^2(a_i)} \quad (4)$$

where $\overline{a_i}$ and $\sigma^2(a_i)$ are the mean and variance of $a_i(t)$, respectively, and E represents the expected value. Statistically, ACF is used to identify the repeating patterns and detect temporal changes in a time series. Relative to AF, ACF may result in improved characterization of the near periodicity of cardiomyocyte motion. To further emphasize the periodicity characteristics, NPMF may be defined as the spectrum of $R_i(\tau)$.

$$F_i(\omega)=|F(R_{ai}(\tau))| \quad (5)$$

where F represents the Fourier transform, |•| is the modulus, and $F_i$ is the NPMF of $b_i$ as a function of frequency ω. NPMF may be more descriptive than AF or ACF and is similar for FBs with the same beating rhythm and distinct for FBs with different rhythm.

The clustering (block 84) after feature extraction may or may not include a learning step, e.g., may be performed iteratively. In one embodiment, affinity propagation (AP) is used to learn the number of clusters and cluster images based on NPMF. First, an affinity matrix S=[S(i,j)] is constructed, that contains pairwise affinities between all FB pairs. The affinity between a pair of FBs $b_i$ and $b_j$ may be defined as the Pearson's correlation coefficient between their NPMFs, i.e., $$S(i,j)=E[(F_i-\overline{F_i})(F_j-\overline{F_{j1}})]/\sigma(F_i)\sigma(j) \quad (6)$$

AP is then applied to the affinity matrix automatically determine the number of clusters and cluster exemplars, and cluster the FBs around cluster exemplars. This is especially beneficial for automated and high-throughput analysis because the number of clusters is usually unknown and different for different data. AP can also be applied to cluster the FBs when the number of clusters is known. After the clusters are defined, the foreground pixels are classified (block 86) based on their affinity to the cluster exemplars. A multiresolution strategy may be used to reduce computation. At each level, each FB is assigned to the cluster of the exemplar with which its affinity value is the highest. Then each FB is checked whether it belongs to the same cluster as its neighbors. If so, foreground pixels inside this FB are assigned to that cluster and no further action is needed. Otherwise, the FB is divided into four smaller FBs with equal size. The process is repeated until all foreground pixels are classified. As a result, each cluster represents a distinct region with synchronous motion. Motion signals are them generated from the segmented image data at block 90, such as via PCA.

Figure 5A:
FIG. 5a is an image representing a foreground mask applied to regions with beating cells.
Figure 5B:
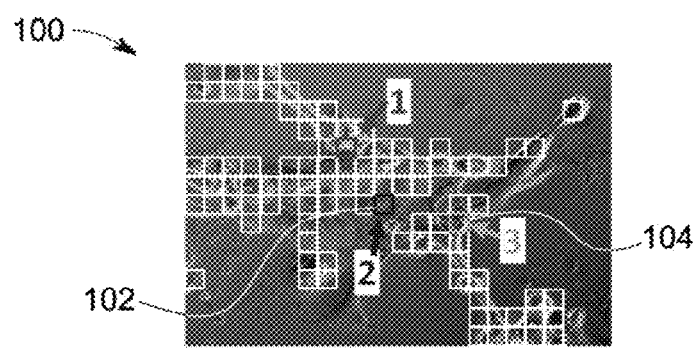
Figure 5C:
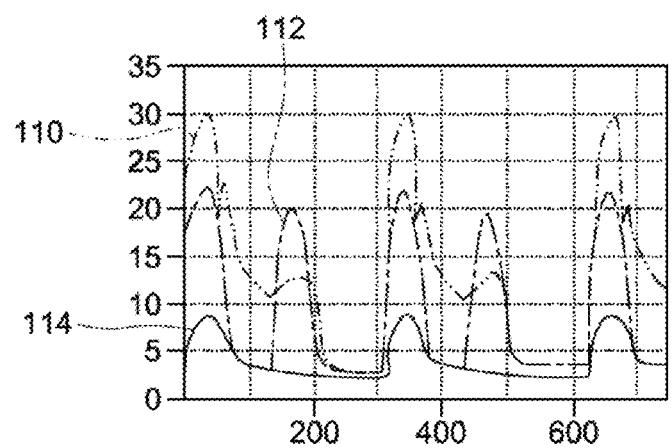
FIG. 5c shows the appearance function for three individual foreground blocks of FIG. 5b.
Figure 5D:
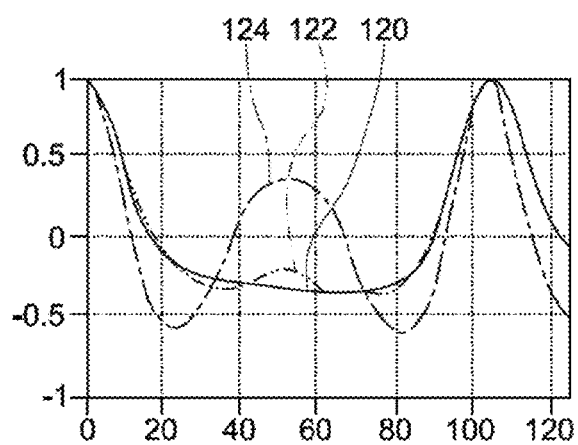
FIG. 5d shows the autocorrelation function for three individual foreground blocks of FIG. 5b.
Figure 5E:
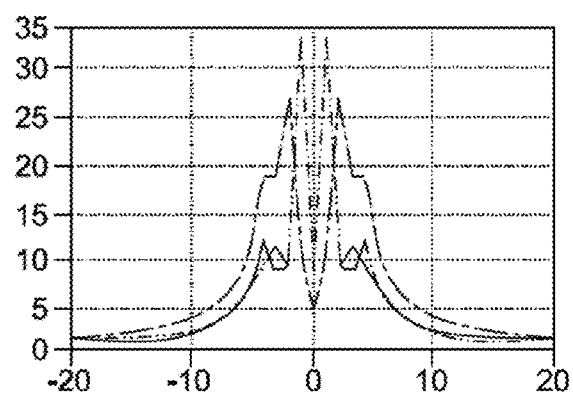
FIG. 5e shows the nearly periodic motion features for three individual foreground blocks of FIG. 5b.
Figure 6A:
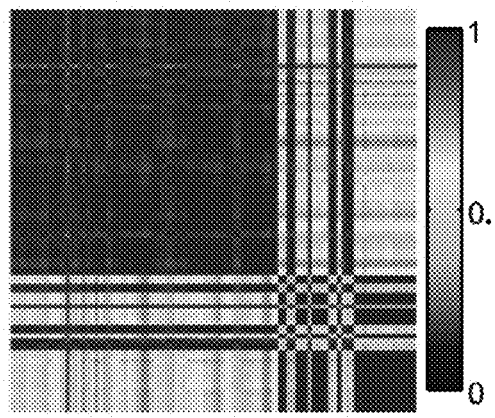
Figure 6B:
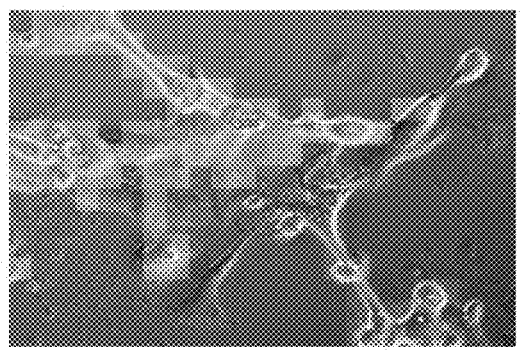
Figure 6C:
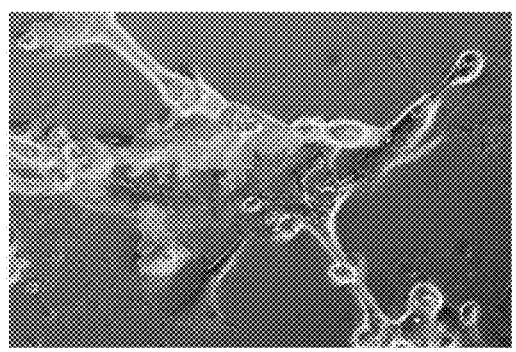

FIGS. 5a-5e are examples of nearly periodic motion features of a dataset with two asynchronous beating regions. FIG. 5a is a foreground mask and FIG. 5b indicates foreground blocks with three selected blocks marked 100, 102, and 104. FIGS. 5c, 5d, and 5e represent the appearance function, autocorrelation function, and nearly periodic motion features for blocks 100, 102, and 104 of the dataset depicted in FIG. 5b. In FIG. 5c, the appearance function 110 corresponds to block 100, the appearance function 112 corresponds to block 104, and the appearance function 114 corresponds to block 102. In FIG. 5d, the data indicate that blocks 100 and 102 (which correspond to autocorrelation functions 120 and 122, respectively) belong to the same synchronous region, and block 104 (which corresponds to autocorrelation function 124) is a different region. FIG. 6a shows the affinity matrix, FIG. 6b shows the clustering results, and FIG. 6c shows the segmentation result for the same dataset.

Figure 7A:
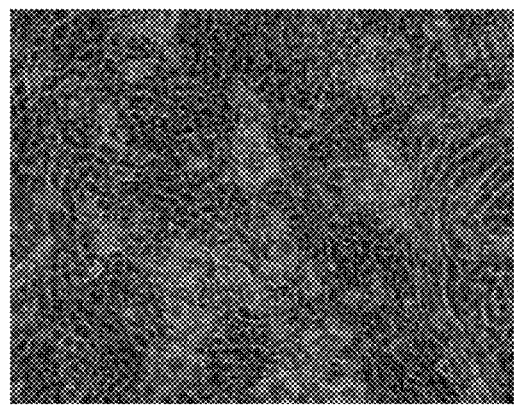
FIG. 7a is an image representing synthetic data.
Figure 7B:
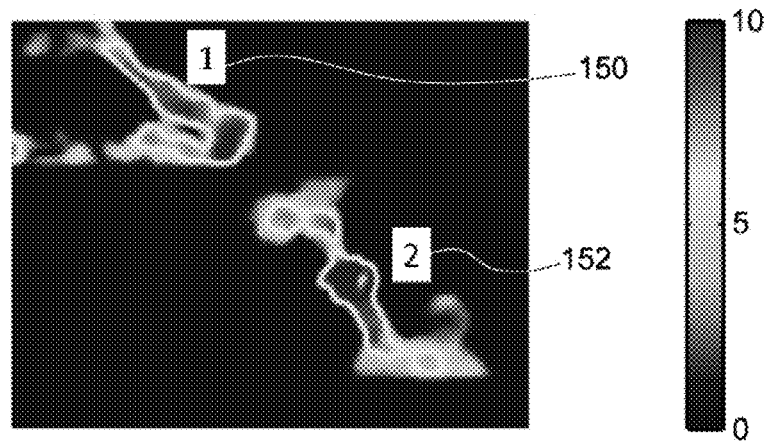
Figure 7C:
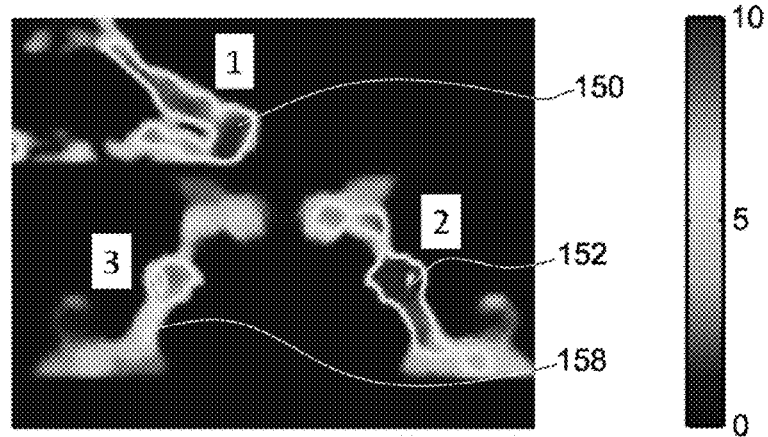
Figure 8A:
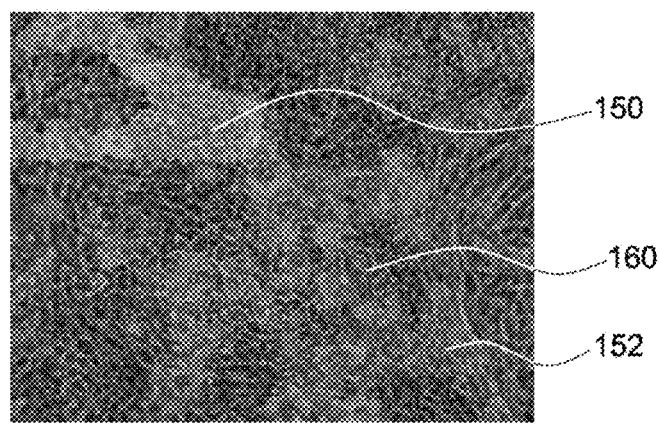
FIG. 8a is an image representing segmentation results for data including two regions.
Figure 8B:
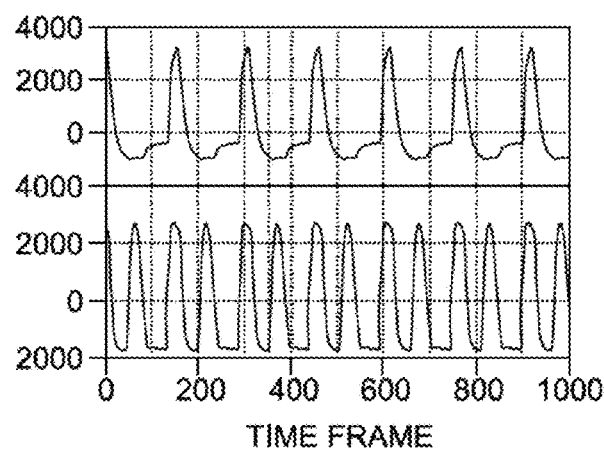
FIG. 8b shows an example of an extracted motion signal.
Figure 8C:
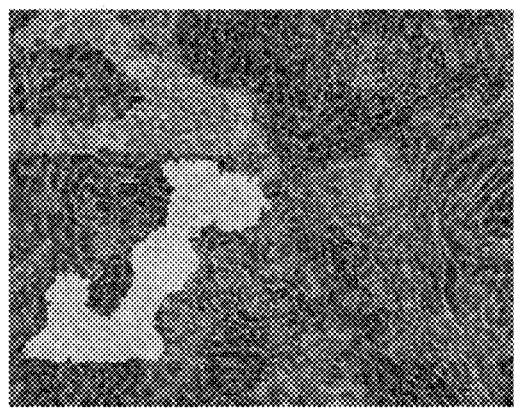
FIG. 8c is an image representing segmentation results for data including three regions.
Figure 8D:
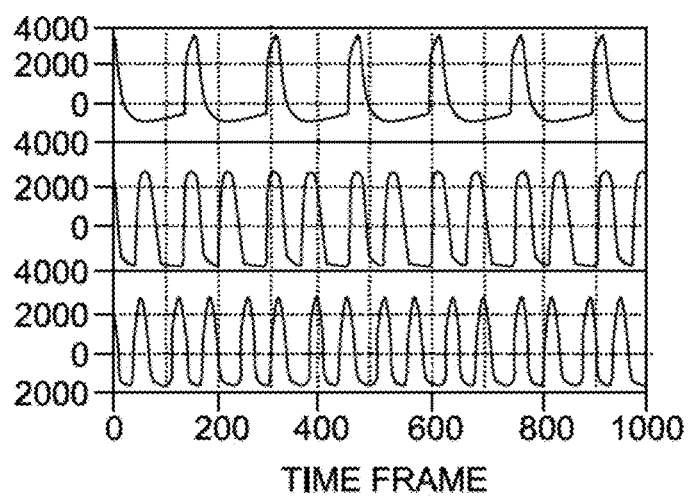
FIG. 8d shows the extracted motion signal for FIG. 8c.

To provide quantitative results, the techniques were evaluated using synthetic data sets, which were generated by deforming a reference cardiomyocyte image (shown in FIG. 7(a)) using motion fields derived from real cardiomyocyte motion. The motion fields were derived as follows from a data set with two regions beating in different rhythms. First, the deformations over time were computed using Demons registration. For both regions, masks were generated by thresholding on intensity variation over time, and motion fields inside the masks during the first beating cycles beating cycle were identified and extracted. A periodic sequence of synthetic motion fields was generated by repeating two sets of motion fields with different periods and magnitudes, Gaussian smoothing, and adding them together. Then an image sequence was generated by deforming the reference cardiomyocytes image using the synthetic motion fields and adding Gaussian noise. Examples of synthetic motion fields are shown in FIGS. 7(b-c). Ten data sets were generated with two synchronous regions (150 and 152) with different beating frequencies. The frequency of the $i^{th}$ region was designated as $f_i$. The ratios $r_1 = f_2/f_1$ in the ten data sets varied from 1.2 to 3.0 with a step of 0.2. Another ten data sets were generated in a similar way except a third region was included (158), which moved in a similar pattern as region 2 (152) but with different magnitudes and periods. The ratios $r_2 = f_3/f_1$ varied from 1.6 to 3.4 with a step of 0.2, and the motion magnitude of region 3 was ⅔ of region 2 (152). All data sets contained 1000 time frames. Since the reference image contains a dense population of cardiomyocytes with no boundaries between moving and stationary regions (FIG. 8(a)), segmentation based on texture or image intensity was precluded.

The present approach correctly identified the number of clusters for all datasets as shown in FIG. 8a-d. In both examples, a small set of pixels 160 were misclassified as region 1 (150) because the motion of these pixels is small (see FIG. 7(b-c)), and their textures are similar to the neighbors. Nonetheless, the misclassified pixels are only a small percentage of the total number of pixels, and thus have negligible effect on the extracted signals. Table 1 summarizes the ratios of correctly classified pixels in all the data sets.

TABLE 1

Rates of correctly classified pixels for synthetic data

Data with 2 regions

| (r1) | 1.2 | 1.4 | 1.6 | 1.8 | 2.0 | 2.2 | 2.4 | 2.6 | 2.8 | 3.0 |
|---|---|---|---|---|---|---|---|---|---|---|
| Accuracy | 99.70% | 99.70% | 99.14% | 99.11% | 98.88% | 99.35% | 99.77% | 100% | 99.83% | 100% |

Data with 3 regions

| (r1, r2) | 1.2, 1.6 | 1.4, 1.8 | 1.6, 2.0 | 1.8, 2.2 | 2.0, 2.4 | 2.2, 2.6 | 2.4, 2.8 | 2.6, 3.0 | 2.8, 3.2 | 3.0, 3.4 |
|---|---|---|---|---|---|---|---|---|---|---|
| Accuracy | 99.75% | 99.69% | 99.48% | 99.55% | 99.47% | 99.79% | 99.93% | 99.91% | 99.89% | 99.94% |

Figure 9A:
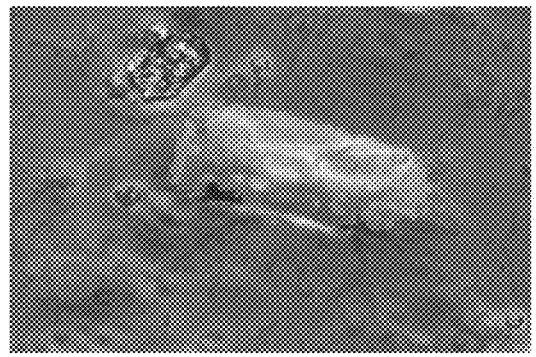
FIG. 9a is an image representing segmentation results.
Figure 9B:
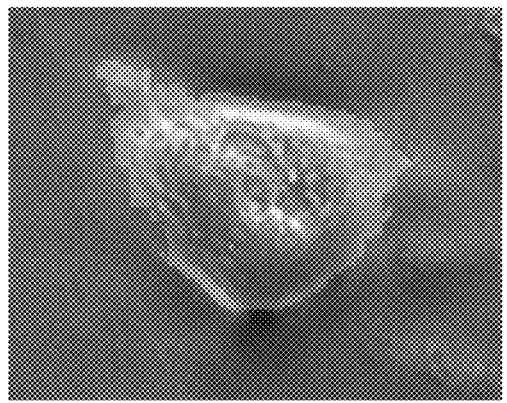
FIG. 9b is an image representing segmentation results.
Figure 9C:
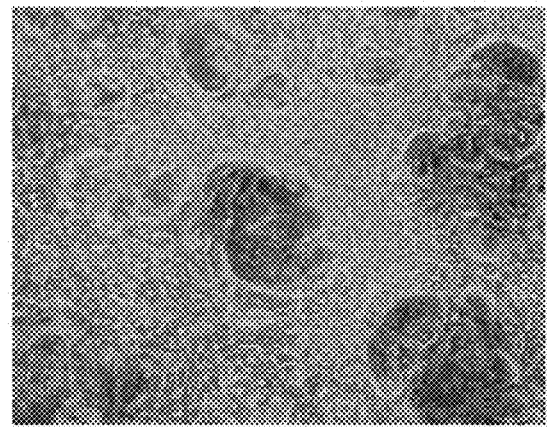
FIG. 9c is an image representing segmentation results.
Figure 9D:
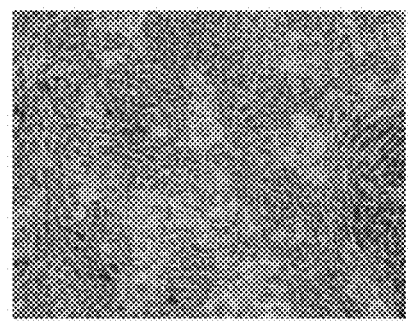
FIG. 9d is an image representing segmentation results.
Figure 9E:
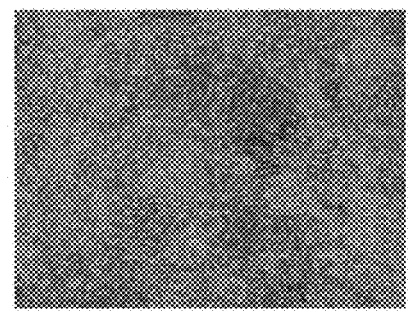
FIG. 9e is an image representing segmentation results.
Figure 9F:
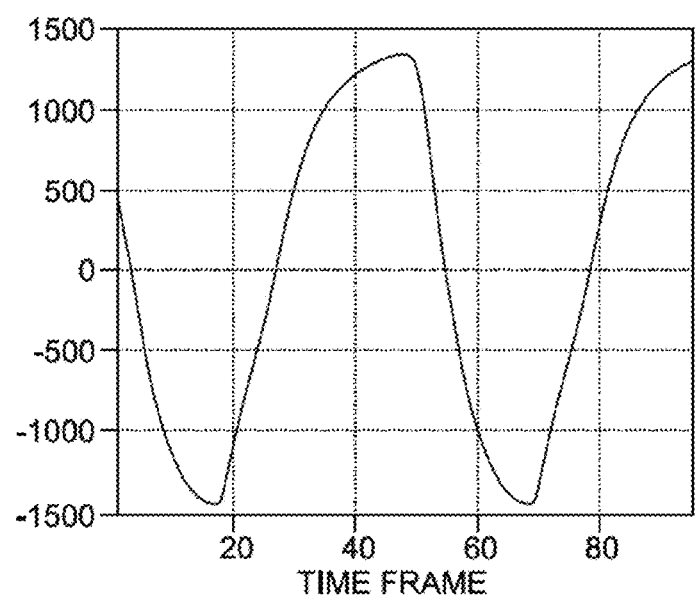
Figure 9G:
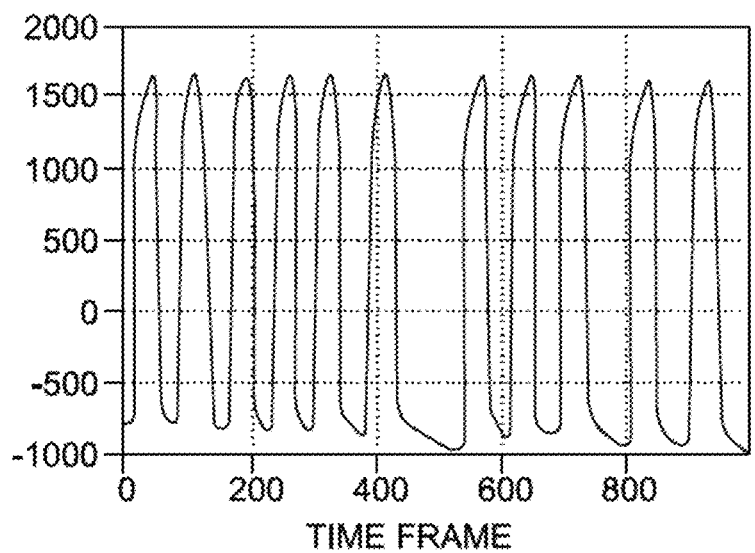
FIG. 9g shows the extracted motion signal for FIG. 9b.
Figure 9H:
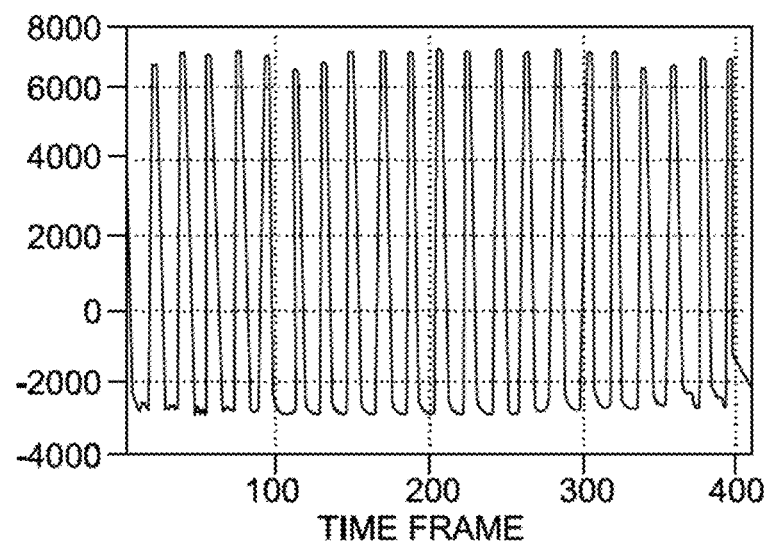
FIG. 9h shows the extracted motion signal for FIG. 9c.
Figure 9I:
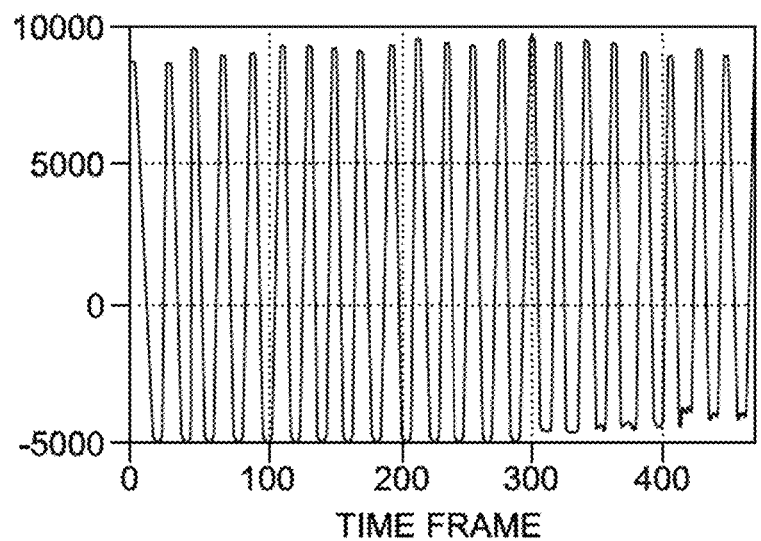
FIG. 9i shows the extracted motion signal for FIG. 9d.
Figure 9J:
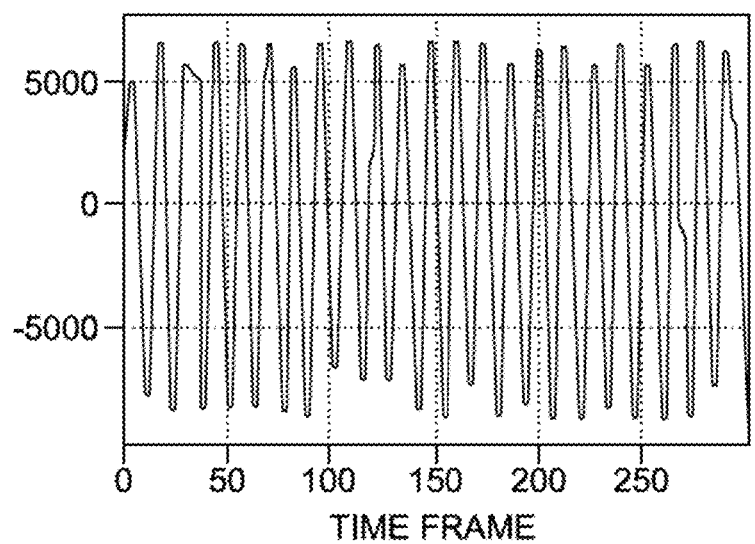
FIG. 9j shows the extracted motion signal for FIG. 9e.

In one example of the techniques described herein, six motion videos of cardiomyocytes were acquired using a microscope. Among them, three were imaged on dense cardiomyocyte populations and 3 on single cell images. The datasets had frame rates varying from 15 to 30 frames per second, image sizes from 264×322 to 480×720 pixels, and video lengths from several seconds to several minutes. Among them, FIG. 6c, FIG. 9a, and FIG. 9b contain single cells, and the moving cells were identified and segmented correctly. FIGS. 9c-e show results on the data with dense cell populations. In these datasets, cardiomyocytes occupied almost the whole image with non-uniform densities, so foreground segmentation was not performed. Both FIG. 9c and FIG. 9d were correctly segmented into two regions; the first one (red) was cells moving in the same rhythm, and the second one (blue) was surrounding tissues with negligible motion. In FIG. 9e, the whole image was correctly clustered into one connected region except a few isolated small regions (blue) that had very little motion. FIGS. 5d and 9f-j show the extracted signals for the five datasets.

Technical effects of the invention include assessment techniques for drug toxicity or effects on cellular characteristics, such as motion. In specific embodiments of the disclosure, the techniques may be used to assess cells treated with a potential pharmaceutical treatment. A lack of significant change relative to baseline may be indicative of a lack of toxicity for the treated cells.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for evaluating cellular motion and/or properties, comprising:
receiving image data corresponding to images of a plurality of cells;
segmenting the image data into a plurality of clusters based on a motion pattern associated with the plurality of cells;
extracting a motion signal from the segmented image data of each respective cluster of the plurality of clusters, wherein the motion signal comprises a periodic motion associated with a rhythm frequency of each individual cluster; and
evaluating at least one of cellular motion properties or cellular properties based on the motion signal from each respective cluster.

2. The method of claim 1, comprising measuring an effect of one or more treatments applied to the plurality of cells based on the evaluation of at least one of cellular motion or cellular properties.

3. The method of claim 1, wherein segmenting the image data comprises:
subtracting stationary components;
extracting features of the image data; and
identifying the plurality of clusters based on the features.

4. The method of claim 3, wherein the image data is divided into non-overlapping blocks.

5. The method of claim 4, wherein each non-overlapping block is identified as a foreground block or a background block based on a proportion of pixels having foreground or background characteristics.

6. The method of claim 4, wherein extracting the features of the image data comprises extracting the features of the foreground blocks.

7. The method of claim 4, wherein each non-overlapping block comprises a single pixel.

8. The method of claim 3, wherein extracting the features of the image data comprises extracting texture-based or intensity-based features of the image data.

9. The method of claim 3, wherein extracting the features of the image data comprises an auto-correlation function.

10. The method of claim 3, wherein extracting the features of the image data comprises extracting the spectral profile of the texture-based or intensity-based features, or an auto-correlation function of the image data.

11. The method of claim 1, wherein a number of the plurality of clusters is not determined before the segmenting.

12. The method of claim 1, wherein the images comprise frames of a video or a set of sequential periodic images.

13. The method of claim 1, wherein the plurality of cells comprise at least one of progenitor cells or myocytes.

14. A computer program provided on one or more tangible computer-readable media, the computer program comprising:
a memory storing executable instructions configured to:
receive image data corresponding to images acquired over time of a plurality of cells;
segment the image data into a plurality of clusters based on a motion pattern associated with the plurality of cells, wherein each individual cluster represents only a portion of the plurality of cells and wherein the image data is not separated into motion components before being segmented into the plurality of clusters;
extract a motion signal from each respective cluster of the plurality of clusters, wherein the motion signal comprises a periodic motion associated with a rhythm frequency of each individual cluster;
evaluate at least one of cellular motion properties or cellular properties based on the motion signal from each respective cluster; and
generate an output indicative of the cellular motion properties of the plurality of clusters.

15. The computer program as recited in claim 14, wherein the instructions configured to segment the image data into a plurality of clusters comprise a learning algorithm configured to iteratively identify potential clusters.

16. The computer program as recited in claim 15, wherein the learning algorithm is configured to assign each foreground pixel to one of the plurality of clusters.

17. The computer program as recited in claim 14, wherein the instructions configured to extract a motion signal comprise instructions to perform principal component analysis on image intensity of each individual cluster.

18. An image analysis system, comprising:
an imager configured to optically analyze a plurality of cells;
data acquisition circuitry configured to acquire images of the plurality of cells via the imager; and
data processing circuitry configured to:
segment image data from the images of the plurality of cells into a plurality of clusters based on a motion pattern associated with the plurality of cells, extract a motion signal from the segmented image data of each individual cluster, wherein the motion signal comprises a periodic motion associated with a rhythm frequency of each individual cluster, and evaluate at least one of cellular motion properties or cellular properties based on the motion signal of each individual cluster.

19. The image analysis system of claim 18, wherein the circuitry configured to extract the motion signal does not use motion field data as an input to extract the motion signal.

20. The image analysis system of claim 18, wherein the image data of each individual cluster comprises non-stationary components of the image data.

* * * * *